Sept. 19, 1967 B. MOUISSIÉ 3,342,431
CASE FOR KINEMATOGRAPHIC FILMS
Filed July 16, 1965
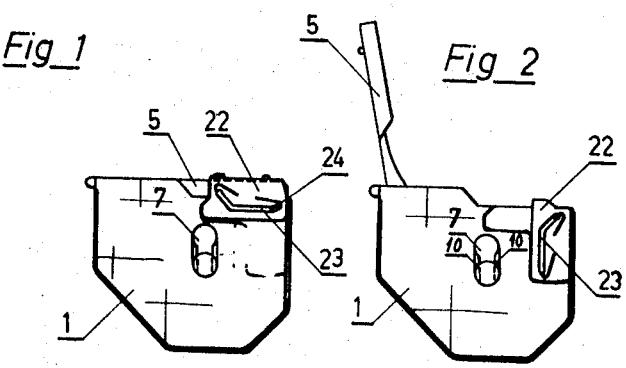
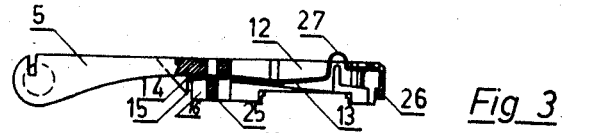
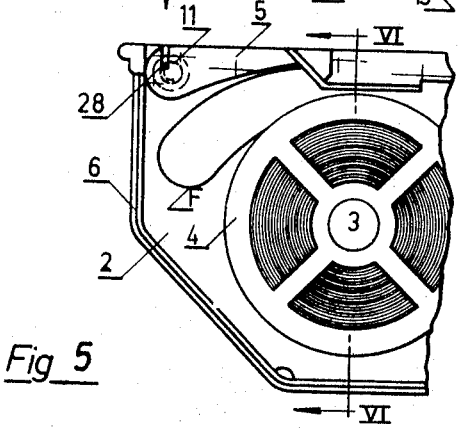
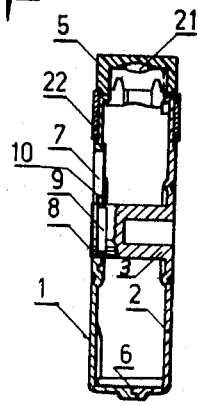
INVENTOR
BOB MOUISSIÉ
BY Emory L. Groff Jr.
ATTORNEY United States Patent Office 3,342,431
Patented Sept. 19, 1967

3,342,431
CASE FOR KINEMATOGRAPHIC FILMS
Bob Mouissié, Yverdon, Vaud, Switzerland, assignor to Paillard S.A., Sainte-Croix, Vaud, Switzerland, a corporation of Switzerland
Filed July 16, 1965, Ser. No. 472,474
Claims priority, application Switzerland, Aug. 7, 1964, 10,367/64
5 Claims. (Cl. 242—55.13)

The present invention has for its object a case for kinematographic films, which comprises a flat box provided with two main side-walls and an apertured cover, wherein said cover is provided with means for securing the end of the kinematographic film carried inside the case regardless of the position assumed by said film. The film may be brought automatically into engagement with the driving members of a kinematographic camera or projector as soon as the case is laid over the latter. The cover is provided with means for guiding the film, which means comprises a channel in the top of the cover.

A case of this type is advantageous since it may be placed on a kinematographic apparatus, for instance a projector, so that the film contained therein may be projected after opening of the cover, without it being necessary to remove the film spool from the case. A case according to the invention allows producing an automatic film projector wherein a series of such cases are laid on a support so as to allow the successive projection of a plurality of films carried in each of the cases.

The accompanying drawing illustrates diagrammatically and by no means in a limiting sense a preferred embodiment of the case according to the invention.

FIGS. 1 and 2 are elevational views of the case respectively in a closed and in an open position.

FIG. 3 is a cross-section through the case cover shown alone.

FIG. 4 is a plan view of said cover.

FIG. 5 is a side view of the case carrying a film spool after removal of one of the side walls of the case.

FIG. 6 is a cross-sectional view of the case, through the axis of the spool-carrying hub.

The case illustrated comprises a flat box formed of two sections 1 and 2, each of which includes a main side wall. The section 2 carries a hub 3 forming a pivot for a film spool 4 adapted to be carried in the case.

The two sections 1 and 2 of the box lie in adjacent relationship throughout their cooperating peripheries except for an open area facing upwardly as illustrated in FIGS. 1 and 2, said open area being adapted to be closed by a cover 5. When the box is closed, its two sections 1 and 2 are slidingly guided with reference to each other by a step-shaped fillet 6.

The box section 1 is provided with a key-hole or elongated opening 7 through which the end 8 of the hub 3 projects, the hub being provided with lateral grooves 9 engaging the edges of the opening 7 in the cooperating section 1.

When assembling the two sections 1 and 2, the end 8 of the hub is fitted inside the opening 7 in the part thereof having the larger diameter. The sections 1 and 2 are then caused to slide with reference to each other until they enter the position illustrated in FIG. 6 wherein the edges 10 of the opening 7 engage the grooves 9 in the hub 3 whereby the section 1 is held fast in its operative position with reference to the section 2.

The section 2 of the case is provided with a stud 11 serving as a pivot for the cover 5 in a manner such that the pivotal axis of the said cover is parallel with the rotary axis of the film spool 4 carried by the hub 3.

Referring more particularly to FIGS. 3 and 4, it is apparent that the cover 5 is provided with an opening 12, one longitudinal edge of which carries an arresting spring 13. Said arresting spring 13 is adapted to hold the film in a well-defined position when it is not to be driven. Said spring is constituted by an elastic wire of steel for instance, of which one bent end 14 is secured to the cover 5 through engagement in a housing 15 formed in the casing in one of the side walls 16 (FIG. 3) of the cover, while the other end of the spring engages slidingly in a recess at the outer end of the wall 16 so that said other end may be shifted in parallelism with said wall when the projection 27 formed on the spring is depressed. This allows releasing the film whenever it is desired to allow it to be engaged by a driving mechanism.

The portion of the cover 5 extending between the opening 12 and the pivotal axis of said cover is provided with a depressed section 21 of which the transverse outline is illustrated clearly in FIG. 6, said depressed part forming a channel guiding the kinematographic film.

The cover 5 is held in its closed position by a pivoting closing cap 22 the shape of which is that of an inverted trough including a medial part engaging the cover 5, so as to cover the opening 12, and two side walls engaging the corresponding main side walls of the box sections 1 and 2. The side walls of said closing cap 22 are each provided with a groove 23 engaged by a stud 24 on the corresponding section 1 or 2 of the case. In order to allow the cover 5 to open, the closing cap 22 lying in the closed position illustrated in FIG. 1 is drawn towards the right-hand side of FIG. 1, so that the grooves 23 slide over the alined studs 24, after which the cap 22 is caused to rock over the corner of the case, so as to enter the position illustrated in FIG. 2. When the cap is moved to this position, the cover 5 is urged into its open position under the action of a spring 28 housed inside the hollow pivot or stud 11.

The insertion of a film inside the case thus described is an easy matter since it is sufficient to open the box by causing the section 1 of the case to slide with reference to the section 2 until the end 8 of the hub 3 lies inside the larger diameter portion of the buttonhole 7 so that it is then possible to separate the two sections 1 and 2. The film spool 4 is then fitted over the hub 3 and the end of the film F is inserted in the gap facing the opening 12 on the cover 5 beetwen the guiding bridges 25 and 26. The arresting spring 13, then engages a perforation in the film, so as to hold the end of the latter fast within the cover, whereby the film reliably enters a well-defined position. To release the film, it is merely necessary to depress the projection 27 on the spring 13, so as to release the end 14 of the spring with reference to the perforation engaged thereby.

When it is desired to project the film, the case is merely laid over a suitable projector and, upon opening of the cover 5, the claws forming part of the projector mechanism are adapted to engage the film which is held correctly in position by the channel, the shutter and the lateral guides forming part of the projector mechanism. These different parts engage the film through the opening 12 in the cover 5. The film may then be driven, since at such time the projection 27 on the arresting spring 13 is depressed by a stop rigid with the mechanism carried by the projector.

Obviously, it is possible to modify various parts of the embodiment described within the scope of the accompanying claims and the case may, for instance, be designed so as to carry an unimpressed film adapted to be used with a view-taking camera. In such a case, the case should obviously be lighttight.

I claim:

1. A flat case for housing a kinematographic film for cooperation with the mechanism of a kinematographic apparatus, comprising two spaced parallel side walls, means between the side walls revolvably carrying the film, an apertured cover movably carried over the two walls and the film therebetween said cover including film guiding means, and releasable means carried by the cover and adapted to secure the outer end of the film carried inside the case, the aperture in the cover allowing said mechanism to operatively engage the film in the case and to simultaneously release said releasable means.

2. A flat case for housing a kinematographic film for cooperation with the mechanism of a kinematographic apparatus, comprising two spaced parallel side walls, a hub between the side walls revolvably carrying the film, an apertured cover extending over the upper portion of said two walls and the film contained therebetween, pivot means for said cover carried by one of said side walls the axis of said pivot means parallel with that of the hub, said cover including film guiding means, and releasable means carried by the cover and adapted to secure the outer end of the film carried inside the case, the aperture in the cover allowing said mechanism to operatively engage the film in the case and to simultaneously release said releasable means.

3. A flat case for housing a kinematographic film for cooperation with the mechanism of a kinematographic projector, comprising two spaced parallel side walls, means on one of said side walls for revolvably carrying the film, an apertured cover movably mounted on one of said side walls to provide a closure for the two walls and the film contained therebetween, said cover including film guiding means, and releasable means carried by the cover and adapted to secure the outer end of the film carried inside the case, the aperture in the cover allowing said mechanism to operatively engage the film in the case and to simultaneously release said releasable means, and said aperture also allowing the passage of light into the projector.

4. A flat case for housing a kinematographic film for cooperation with the mechanism of a kinematographic apparatus, comprising two spaced parallel side walls, means on one of said side walls for revolvably carrying the film, an apertured cover movably mounted on one of said side walls to provide a closure for the two walls and the film contained therebetween said cover including film guiding means, a spring carried by the cover along one edge of said aperture and adapted to secure the outer end of the film carried inside the case, the aperture in the cover allowing said mechanism to operatively engage the film in the case and to simultaneously shift the spring out of engagement with the outer end of the film.

5. A flat case for housing a kinematographic film for cooperation with the mechanism of a kinematographic apparatus, comprising two independent side walls, means detachably securing said walls together in parallel spaced relationship, a hub rigid with one wall, said hub extending toward the other wall and revolvably carrying the film, an apertured cover movably mounted on one of said side walls to provide a closure for the two walls and the film contained therebetween, said cover including film guiding means, and releasable means carried by the cover and adapted to secure the outer end of the film carried inside the case, the aperture in the cover allowing said mechanism to operatively engage the film in the case and to simultaneously release said releasable means.

References Cited

UNITED STATES PATENTS

| 1,685,010 | 9/1928 | Thornton | 352—78 |
| 3,169,721 | 2/1965 | Laa et al. | 242—55.13 |

FOREIGN PATENTS 386,199  6/1908  France.

LEONARD D. CHRISTIAN, *Primary Examiner.*